United States Patent
Porte et al.

(10) Patent No.: US 11,745,887 B2
(45) Date of Patent: Sep. 5, 2023

(54) MULTIFREQUENCY ABSORPTION ACOUSTIC PANEL FOR AN AIRCRAFT NACELLE

(71) Applicant: Airbus Operations (S.A.S.), Toulouse (FR)

(72) Inventors: Alain Porte, Toulouse (FR); Jacques Lalane, Toulouse (FR); Arnaud Bourhis, Toulouse (FR); Florent Mercat, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 334 days.

(21) Appl. No.: 17/091,604

(22) Filed: Nov. 6, 2020

(65) Prior Publication Data

US 2021/0237890 A1 Aug. 5, 2021

(30) Foreign Application Priority Data

Nov. 7, 2019 (FR) ..................................... 1912487

(51) Int. Cl.
*B64D 33/02* (2006.01)
*G10K 11/172* (2006.01)
*G10K 11/168* (2006.01)

(52) U.S. Cl.
CPC ............ *B64D 33/02* (2013.01); *G10K 11/168* (2013.01); *G10K 11/172* (2013.01); *B64D 2033/0206* (2013.01)

(58) Field of Classification Search
CPC ............ B64D 33/02; B64D 2033/0206; G10K 11/168; G10K 11/172
See application file for complete search history.

(56) References Cited

U.S. PATENT DOCUMENTS

| 7,857,093 B2 | 12/2010 | Stemberger et al. |
| 8,820,477 B1 * | 9/2014 | Herrera ................ F02C 7/045 |
| | | 181/292 |

(Continued)

FOREIGN PATENT DOCUMENTS

| EP | 1880941 A2 * | 1/2008 | ............ B64D 33/02 |
| EP | 3244038 A1 * | 11/2017 | ............ B64D 29/00 |

(Continued)

OTHER PUBLICATIONS

French Search Report for Application No. 1912487 dated Jul. 8, 2020.

*Primary Examiner* — Forrest M Phillips
(74) *Attorney, Agent, or Firm* — KDW Firm PLLC

(57) ABSTRACT

An acoustic panel for an aircraft nacelle includes, from a central axis of the nacelle to the exterior thereof, a resistive skin perforated with sound-absorbing micro-perforations, a first attenuation stage, a septum perforated with holes, a second attenuation stage, and a back skin configured to provide the mechanical strength of the acoustic panel. The septum is a planar wall having a thickness greater than that of the resistive skin, preferably greater than 4 mm. Such a panel is configured to attenuate several frequency ranges one of which being a low-frequency range, while optimizing the weight, the cost and the air intake functions. The thickness of the septum, the dimensions of the holes in the septum, the OAR of the septum and the height of the second attenuation stage are adjusted to match the mean attenuated low frequency to the vibration frequency of the aircraft engine.

15 Claims, 2 Drawing Sheets

(56) References Cited

U.S. PATENT DOCUMENTS

| | | |
|---|---|---|
| 9,732,677 B1 | 8/2017 | Chien et al. |
| 11,427,299 B2 * | 8/2022 | Desjoyeaux ............. B64C 1/40 |
| 2008/0179448 A1 | 7/2008 | Layland et al. |
| 2015/0041248 A1 * | 2/2015 | Ichihashi .................. F02C 7/24 |
| | | 29/896.2 |
| 2015/0315972 A1 * | 11/2015 | Lumbab .................. F02C 7/045 |
| | | 181/290 |
| 2016/0264231 A1 | 9/2016 | Stache et al. |
| 2017/0089238 A1 * | 3/2017 | Leyko .................... B33Y 80/00 |

FOREIGN PATENT DOCUMENTS

| | | | | |
|---|---|---|---|---|
| EP | 3489947 A1 | * | 5/2019 | ............. B64D 33/02 |
| EP | 3670329 A1 | * | 6/2020 | ........... B32B 21/047 |
| GB | 2588857 A | * | 5/2021 | ........... B32B 37/146 |

* cited by examiner

MULTIFREQUENCY ABSORPTION ACOUSTIC PANEL FOR AN AIRCRAFT NACELLE

CROSS-REFERENCE TO RELATED APPLICATION

This application claims the benefit of and priority to French patent application number 19 12487 filed on Nov. 7, 2019, the entire disclosure of which is incorporated by reference herein.

TECHNICAL FIELD

The present application concerns an acoustic panel for an aircraft nacelle, as well as a nacelle, a propulsion unit and an aircraft equipped with such a panel.

BACKGROUND

A nacelle conventionally comprises, form the front toward the rear, a first section upstream of the aerodynamic flow, called the air intake, a second section that surrounds the casing of the engine fan, called the fan access door assembly, and a third section that generally features a thrust reversal zone that surrounds the turbine body of the engine downstream of the aerodynamic flow.

An air intake, such as that shown in the appended FIG. 1, usually includes structure elements such as a front frame 101 and a rear frame 104, together with, from the front toward the rear of the nacelle, a lip 100 carried by the front frame 101, external panels 102 extending the lip on the outside of the nacelle (known as "outer barrels" or "OTB"), and internal acoustic panels 103 extending the lip inside the nacelle and delimiting an interior duct enabling channeling of air in the direction of the engine, the external panels 102 and internal panels 103 being carried by the front frame 101 and the rear frame 104.

The shape of the air intake and/or the systems with which it is equipped (for example the deicing tube 105 must make it possible to prevent the formation and/or the accumulation of ice or frost, to limit the impact of sound nuisances, to provide an aerodynamic function, and to prevent the penetration of birds into the fan compartment containing the engine systems.

Sound nuisances are usually attenuated by providing the aforementioned acoustic panels 103. Note that the thrust reversal zone of the nacelle may also include acoustic panels.

Throughout the description an acoustic panel (whether it is a prior art panel or a panel in accordance with the disclosure herein) is observed as if installed in an air intake of the aircraft. The expressions "transverse direction" and "transversely" then refer to a direction (axis Y in FIGS. 1 and 2) that is orthogonal to the central axis X of the air intake and to the axis Z of gravity. The expression "longitudinally" refers to a direction that is substantially parallel to the central axis X of the air intake or which at least lies in a longitudinal plane, that is to say a plane containing that central axis X.

SUMMARY

The known air intake acoustic panels generally consist of:
a perforated resistive skin that forms the visible face of the interior duct of the air intake and the objective of which is to allow to pass and to damp sound waves,
a back skin the essential function of which is to provide the structural strength of the panel,
a core, generally of honeycomb construction, to respective opposite sides of which are fixed the resistive skin and the back skin, which core contributes both to the mechanical strength of the panel and to acoustic damping, the main function of the core being to set the maximum acoustic absorption frequency.

From the mechanical point of view, it is necessary to note that the acoustic panel must be able to withstand a certain aerodynamic loading (overpressure), impacts with exterior objects such as birds, possible loss of a fan blade and high thermal variations.

The acoustic skin of the known acoustic panels is pierced by a multitude of holes to absorb sound waves. The diameter of the sound absorbing holes addresses two antagonistic constraints:
the greater the diameter of the holes, the greater their (harmful) influence on drag;
the smaller the diameter of the holes, the greater the tendency of the holes to become blocked in use; in order to prevent the holes from being blocked, it is necessary for the thickness of the pierced layer to be less than or equal to the diameter of the holes; but below 0.6 mm thickness the resistive skin obtained suffers from insufficient mechanical strength.

In practice the known resistive skins consist of two to three plies and have a total thickness between 0.6 mm and 1.6 mm inclusive, which leads to holes with diameters between 0.8 mm and 1.6 mm inclusive.

A major disadvantage of earlier known acoustic panels is that they damp only a small range of sound frequencies around a mean sound frequency. That mean sound frequency is determined in particular by the thickness of the core of the acoustic panels, the cells of which, associated with the holes in the resistive skin, function as Helmholtz resonators.

The thicker the core of the acoustic panel, the lower the damped frequency. With the introduction of high-bypass engines that have greater dimensions (in a transverse plane) and that are shorter (in the longitudinal direction), the frequencies to be damped are lower. The person skilled in the art is therefore tempted to equip the air intakes with ever thicker acoustic panels. But the thicker the core of the panel the more the weight and the cost of the acoustic panel increase.

It is therefore necessary to arrive at solutions that make it possible both to lower the damped mean sound frequency and to widen the range of sound frequencies that are damped or that make it possible to damp a plurality of ranges of sound frequencies including a range of low frequencies, whilst optimizing the weight, the cost and the functions of the air intake.

U.S. Pat. No. 7,857,093 proposes an air intake including classic acoustic panels (having a perforated resistive skin, a honeycomb core and a back skin) that extend from the front frame to the rear frame of the air intake. These acoustic panels may optionally incorporate a septum that divides the cells of the honeycomb core. These acoustic panels are associated with a low-frequency lining that extends over an annular band between only 1 and 15 cm inclusive wide, preferably situated near the rear frame and that includes a honeycomb core and a back skin. With regard to this low-frequency lining, the honeycomb of the acoustic panels has no septum, the resistive skin of the acoustic panels features "large openings" having a diameter that is only slightly less than that of the cell of the honeycomb of the panels, and the back skin of the acoustic panels is perforated by similar openings so that the cells of the honeycomb of the panels communicate with the cells of the honeycomb of the lining. Moreover, the back skin of the acoustic panels is impermeable and the resistive skin of the panels is provided with perforations of smaller size than the aforementioned "large openings".

US2008/0179448 discloses an air intake in which the wall on the side of the interior duct of the air intake consists successively, from the interior of the air intake towards the exterior: a resistive skin formed of four plies, an acoustic core integrating two damping stages, and a thicker back skin formed of eight plies. The first damping stage is a first honeycomb 20 mm thick, the second damping stage is a second honeycomb 5 mm thick. The honeycombs are separated by a septum of small thickness compared to the resistive skin, the septum apparently consisting of a single ply.

The known air intakes produce results that are still insufficient in terms of absorbing sound nuisances due to the low frequencies.

The disclosure herein aims to propose an acoustic solution that makes it possible to have a plurality of damped frequency ranges including a low-frequency range whilst optimizing the weight, the cost and the functions of the air intake.

To this end, the subject matter herein discloses an acoustic panel for an aircraft nacelle, including, from the central axis of the nacelle toward the exterior of the latter:
- a resistive skin that forms the visible face of an interior duct of the nacelle, which resistive skin is microperforated by sound absorbing holes,
- a core adapted to damp sound waves, including a first damping stage and a second damping stage separated by a septum, which septum is a plane wall pierced with communicating holes between the two damping stages, and
- a back skin configured to provide the mechanical strength of the acoustic panel.

This panel is characterized in that the septum has a thickness greater than that of the resistive skin.

In everything that follows, by open area ratio (OAR) is meant the percentage perforated area on an acoustic skin. Two main factors influence the acoustic resistance of a panel, the OAR of its resistive skin and the height of its damping core.

The acoustic pan& in accordance with the disclosure herein advantageously has one or more of the following features (all combinations being in accordance with the disclosure herein).

The thickness of the septum is greater than or equal to 4 mm. Throughout the description the thickness of a wall, whether that is the resistive skin, the septum or the rear wall, designates the dimension of that wall in radial directions of the nacelle. Likewise, the height of a damping stage denotes the dimension of that stage in radial directions of the nacelle.

The first damping stage is a cellular structure, preferably a honeycomb structure.

The second damping stage is a cellular structure, preferably a honeycomb structure.

The thickness of the resistive skin is less than 2 mm, preferably between 0.6 mm and 1.5 mm inclusive.

The sound absorbing holes (in the resistive skin) have a diameter between 0.6 mm and 1.6 mm inclusive.

The first damping stage has a height between 25 mm and 45 mm inclusive.

The second damping stage has a height between 15 mm and 45 mm inclusive.

The OAR of the resistive skin is equal to or greater than 50 divided by the OAR of the septum. In other words, the product of the OAR of the resistive skin (as a percentage) by the OAR of the septum (as a percentage) is greater than or equal to 50. This relation makes it possible to guarantee that the sound waves pass through the two damping stages and therefore that two ranges of sound waves, one high the other low, are damped.

The OAR of the resistive skin ($OAR_{skin}$) is between 5% and 50% but is limited by impacts on the structure of the panel and on drag. In practice the aim is the lowest possible OAR.

The OAR of the septum ($OAR_{septum}$) is between 1 and 10% inclusive, preferably limited by the relation $OAR_{skin} > 50/OAR_{septum}$.

Also, and above all, the OAR of the septum as a percentage is substantially equal to the thickness in millimeters of the septum. This ratio makes it possible to "fix" the frequencies to be damped, as explained hereinafter.

In a preferred embodiment, the OAR of the resistive skin is approximately 8%, the OAR of the septum is approximately 7%, and the septum has a thickness of the order of 7 mm.

Regarding the diameter of the communication holes (in the septum), there may be provided for the entry into the second damping stage holes of "large" diameter in order to damp "low" frequencies, without this having a negative impact on aerodynamics. Moreover, a diameter greater than or equal to 0.8 mm is recommended to provide a function of draining the panel.

The first and second damping stages consist of or comprise a material selected from: glass, thermoplastic materials, metals (or metal alloys) and more particularly titanium and aluminum. The septum consists of or comprises a material selected from: thermoplastic or thermoset materials based on carbon. The resistive skin consists of or comprises a material selected from: thermoplastic or thermoset materials based on carbon, metals (or alloys) and more particularly titanium, aluminum, stainless steel.

The method(s) of fixing the various elements of the panel together are selected as a function of the materials constituting the elements, from: gluing, welding, brazing, etc.

The cells of the first and second damping stages may have various shapes, of polygonal (for example hexagonal) section or otherwise, provided that the targeted acoustic requirements are respected and the selected shape(s) do not give rise to manufacturing problems. The shape of the cells may be identical or vary from one damping stage to the other.

The disclosure herein extends to an aircraft nacelle equipped with acoustic panels in accordance with the disclosure herein and to an aircraft propulsion unit and to an aircraft including at least one such nacelle.

BRIEF DESCRIPTION OF THE DRAWINGS

One embodiment of the disclosure herein will be clearly understood and its advantages will become more clearly apparent on reading the following detailed description given by way of nonlimiting illustration with reference to the appended drawings, in which.

Identical elements represented in the aforementioned figures are identified by identical reference numbers.

DETAILED DESCRIPTION

Figure 1:
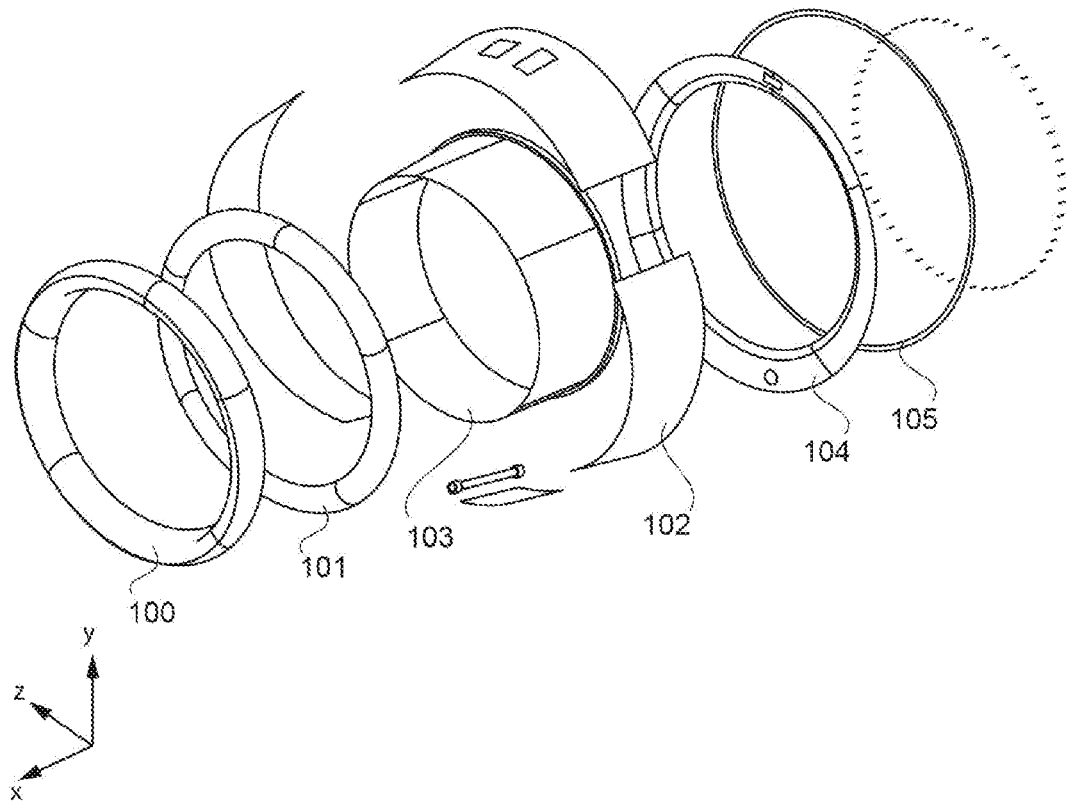
FIG. 1 is an exploded perspective view of a prior art air intake.
Figure 2:
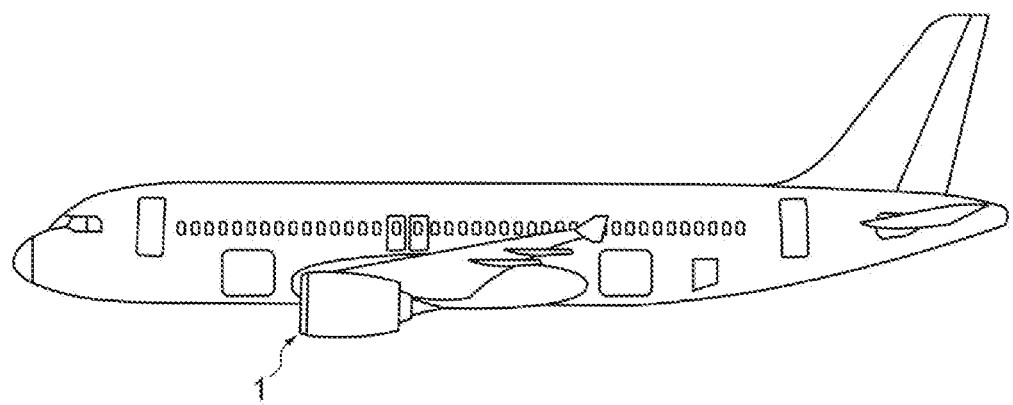
FIG. 2 is a profile view of an aircraft on which is seen a nacelle 1 that may be equipped with acoustic panels in accordance with the disclosure herein.

The air intake represented in FIG. 1 and the nacelle represented in FIG. 2 are elements known to the person skilled in the art; the air intake from FIG. 1 has been described in the introduction.

Figure 3:
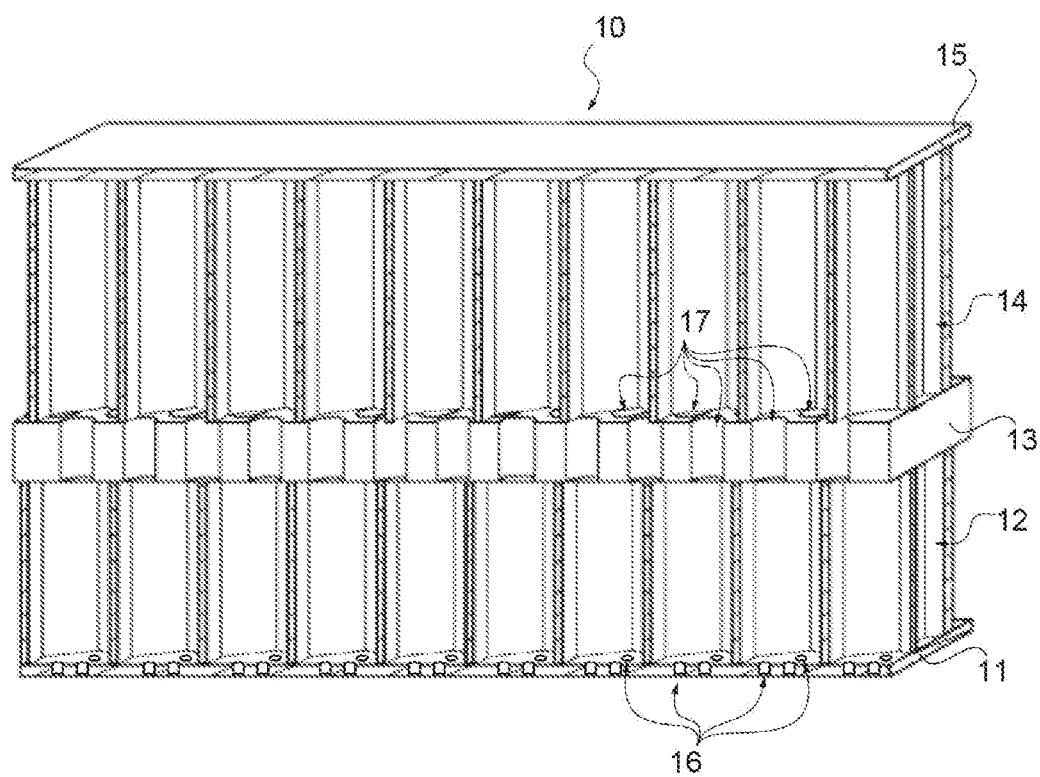
FIG. 3 is a view in cross section of an acoustic pan& portion in accordance with the disclosure herein.

FIG. 3 shows the structure of an acoustic panel 10 in accordance with the disclosure herein, which structure may be used to form the panels 103 of the air intake from FIG. 1.

The acoustic panel 10 from FIG. 3 includes a resistive skin 11, a first damping stage 12, a septum 13, a second damping stage 14 and a back skin 15.

The resistive skin 11 is of small thickness, between 0.6 and 1.5 mm inclusive, and is pierced by a multitude of sound absorbing holes 16 of small diameter, for example between 0.8 and 1.6 mm inclusive, which diameter is advantageously slightly greater than the thickness of the resistive skin 11. The sound absorbing holes 16 are considered to be microperforations that generate little drag.

In the example illustrated the sound absorbing holes 16 are circular. But this is not limiting on the disclosure herein; they could have any shape, geometrical or otherwise.

The first damping stage 12 consists of or comprises a honeycomb cellular structure; it has a height between 25 and 45 mm inclusive. Sized in this way and associated with a resistive skin of small thickness (less than 2 mm) it contributes to absorbing a first range of sound waves at "high" frequencies, between 1000 Hz and 4000 Hz inclusive.

The septum 13 is a thick plane wall, in that it has a greater thickness than the resistive skin and preferably greater than 4 m for example of the order of 7 mm. The thickness of the septum is selected as a function of the mean low frequency to be damped (which depends on the engine). It is also the result of a compromise between the benefits obtained by a greater thickness of the septum on the acoustic plane and the undesirable consequences of too thick a septum in terms of weight. From an acoustic point of view a septum thickness up to 20 mm could be justified but in practice a smaller thickness will be selected for reasons of weight.

The second damping stage 14 consists of or comprises a honeycomb cellular structure; it has a height between 15 and 45 mm inclusive. Dimensioned in this way and associated with a thick septum it contributes to absorbing a second range of sound waves at "low" frequencies, between 300 Hz and 600 Hz inclusive. The height of the second damping stage is selected as a function of the thickness of the septum and of the mean frequency that it is wished to damp.

In the example illustrated the cells of the two damping stages have identical (hexagonal) cross sections and are aligned in the radial direction (the panel being observed as if positioned in an air intake). But this is not limiting on the disclosure herein; the first damping stage could for example feature smaller cells than the second stage.

The septum is pierced by communication holes 17 between the two sound absorbing stages. The diameter of the communicating holes 17 may be greater than the diameter of the sound absorbing holes 16, which is limited by the negative influence of the holes on drag. The diameter (or the greatest front dimension if the holes of the latter are not circular) is therefore selected to be greater than 0.8 mm to enable the evacuation of water and thus to provide a drainage function. The maximum diameter is fixed to obtain the required OAR with at least one hole per cell of the honeycomb of the second damping stage.

The OAR of the septum is preferably between 1% and 10% inclusive, for example of the order of 7%. The inventors have demonstrated the importance of the ratio between the OAR and the thickness of the septum. The OAR of the septum as a percentage is advantageously substantially equal to the thickness of the septum in millimeters.

This ratio makes it possible to "fix" the damped frequencies. The mean low frequency to be attenuated is determined by the engine in question. To attenuate a given mean low frequency it is possible to act on the diameter of the communicating holes, the OAR of the septum, the thickness of the septum and the height of the second damping stage. Each of these parameters is limited upward or downward by the appearance of various disadvantages. For example, the thickness of the septum 13 is therefore limited (upward) by the maximum weight that is fixed for the panel, the diameter of the communicating holes 17 is limited (downward) by the occurrence of the problem of condensation and accumulation of water in the panel. The height of the second damping stage 14 is also variable (upward) only to a small degree because it influences the overall size of the acoustic panel. For the same damping height, if the thickness of the septum and the OAR of the septum are increased, whilst maintaining the equality between these two parameters, the frequency damped by the panel is lowered. It is therefore possible to adjust the mean frequency damped by the panel to make it correspond to the vibration frequency of the engine.

The back skin is a solid airtight wall. Its thickness is selected so as to confer on the panel the required mechanical strength, also taking account of its influence on the weight of the panel. It is for example between 1 mm and 8 mm inclusive.

The disclosure herein extends to all variants that may occur to the person skilled in the art falling within the scope of the appended claims. For example, the honeycomb structure of the first or second damping stage may therefore be replaced by some other known type of damping structure. The septum may be less thick than that illustrated provided that it remains thicker than the resistive skin. In this case, to maintain a range of low frequencies damped as low as that of the panel illustrated (the septum of which is thicker), it will be necessary to increase the height of the second damping stage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel for an aircraft nacelle, comprising, from a central axis of the nacelle toward an exterior of the nacelle:

a resistive skin that forms a visible face of an interior duct of the nacelle, wherein the resistive skin is microperforated to have sound absorbing holes;

a core adapted to damp sound waves, the core comprising a first damping stage and a second damping stage which are separated from each other by a septum, wherein the septum is a planar wall that is formed with communication holes that extend between the first and second damping stages; and a back skin configured to provide mechanical strength for the acoustic panel;

wherein a thickness of the septum is greater than a thickness of the resistive skin.

2. The acoustic panel of claim 1, wherein the thickness of the septum is greater than or equal to 4 mm.

3. The acoustic panel of claim 1, wherein the thickness of the resistive skin is between 0.6 mm and 1.5 mm, inclusive.

4. The acoustic panel of claim 1, wherein the sound absorbing holes of the resistive skin have a circular shape with a diameter between 0.8 mm and 1.6 mm, inclusive.

5. The acoustic panel of claim 1, wherein the first and second damping stages are honeycomb cellular structures.

6. The acoustic panel of claim 1, wherein the first damping stage has a height between 25 mm and 45 mm, inclusive.

7. The acoustic panel of claim 1, wherein the second damping stage has a height between 15 mm and 45 mm, inclusive.

8. The acoustic panel of claim 1, wherein the resistive skin and the septum have each have a respective open area ratio (OAR), as a percentage, such that a product of the OAR of the resistive skin by the OAR of the septum is greater than or equal to 50%.

9. The acoustic panel of claim 1, wherein an open area ratio (OAR) of the resistive skin is between 5% and 50%, inclusive, and an OAR of the septum is between 1% and 10%, inclusive.

10. The acoustic panel of claim 1, wherein the septum has an open area ratio (OAR) as a percentage, that is substantially equal to the thickness, in millimeters, of the septum.

11. The acoustic panel of claim 1, wherein the resistive skin has an open area ratio (OAR) of an order of 8% and wherein the septum has an OAR of an order of 7% and a thickness of an order of 7 mm.

12. The acoustic panel of claim 1, wherein the communicating holes have a diameter greater than or equal to 0.8 mm.

13. An aircraft nacelle comprising acoustic panels of claim 1.

14. An aircraft propulsion unit comprising the aircraft nacelle of claim 13.

15. An aircraft comprising at least one aircraft nacelle of claim 13.

* * * * *

UNITED STATES PATENT AND TRADEMARK OFFICE
CERTIFICATE OF CORRECTION

PATENT NO. : 11,745,887 B2
APPLICATION NO. : 17/091604
DATED : September 5, 2023
INVENTOR(S) : Alain Porte et al.

It is certified that error appears in the above-identified patent and that said Letters Patent is hereby corrected as shown below:

In the Specification

Column 3, Line 46: "pan&" should be -- panel --.

Column 4, Line 13: after the numeral "1", insert -- % --.

Column 5, Line 1: "pan&" should be -- panel --.

Column 5, Line 37: "4 m" should be -- 4 mm --.

In the Claims

Column 6, Line 65: after "comprising", remove ",".

Column 8, Line 11: after "(OAR)", insert -- , --.

Signed and Sealed this
Fifteenth Day of October, 2024

Katherine Kelly Vidal
*Director of the United States Patent and Trademark Office*